Feb. 22, 1966
J. E. COX
3,236,952
DROPBACK SELECTOR
Filed Feb. 23, 1960
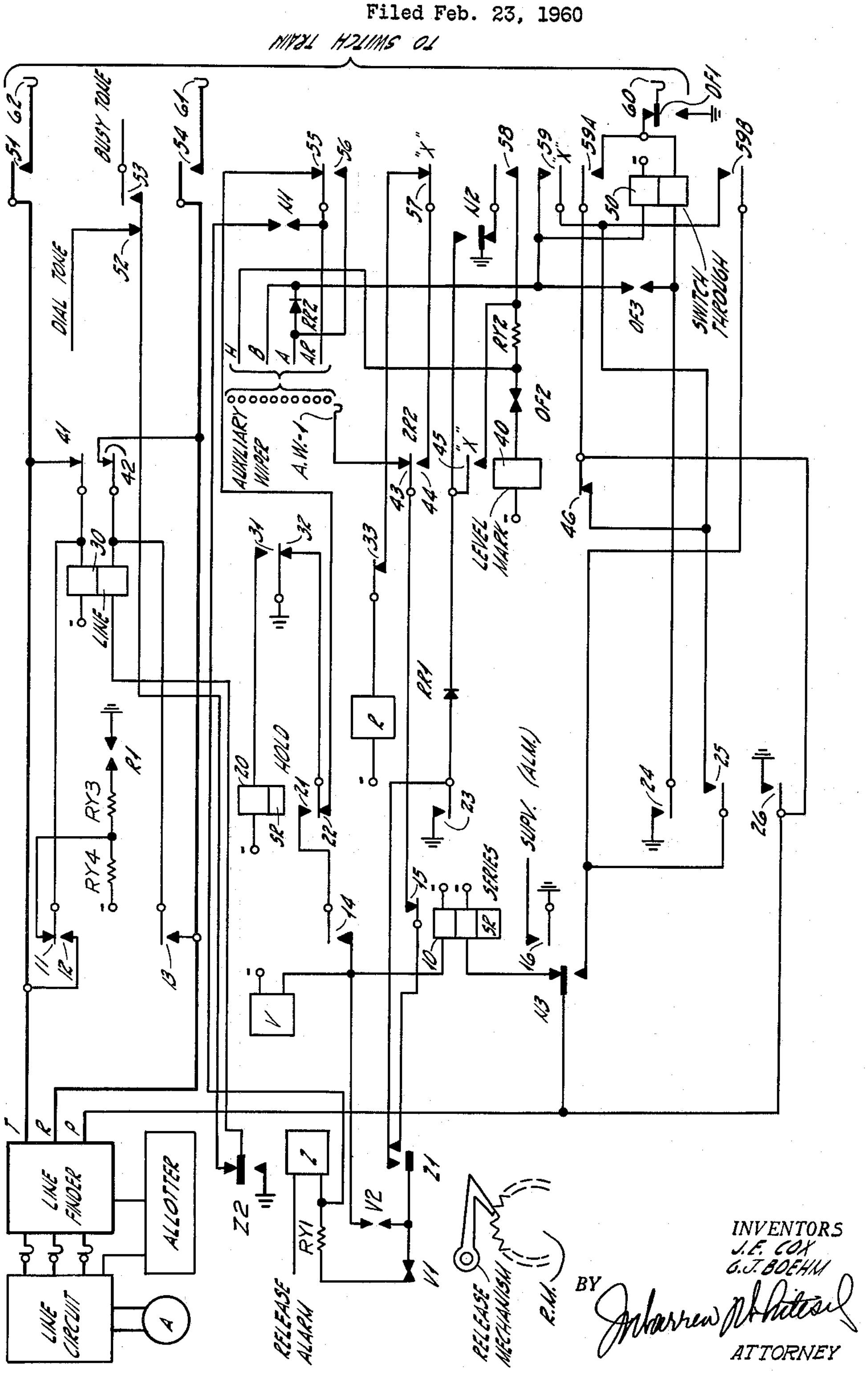
INVENTORS
J.E. COX
G.J. BOEHM
BY
ATTORNEY United States Patent Office 3,236,952

Patented Feb. 22, 1966

3,236,952
DROPBACK SELECTOR

John Edward Cox, Passaic, and Guenter J. Boehm, Englewood, N.J., assignors to International Telephone and Telegraph Corporation, New York, N.Y., a corporation of Maryland Filed Feb. 23, 1960, Ser. No. 10,364
15 Claims. (Cl. 179—18)

This invention relates to step-by-step switching arrangements suitable for use in automatic telephone systems and more particularly to selectors.

In the distant past, automatic switches were utilized for performing relatively few functions such as extending calls and sending supervisory signals. When the number of functions performed by automatic switches increased, the number of components used to control the switches also increased. For example, side switches, post spring contact arrays, auxiliary or level wipers and associated relays, and combinations thereof are among the components that have been utilized to control automatic switches. Two principal devices which have been used recently are post spring contact arrays and auxiliary wipers with their associated relays. As the required switch flexibility increased, the post spring contact arrays also increased in size and became unduly costly. In a similar manner, when auxiliary wipers were utilized, a great number of relays were required to obtain the desired number of switch functions thereby increasing costs. It is, therefore, desirable to control automatic multifunction switches such as selectors without requiring a complex array of post spring contacts and while using a minimum number of relays.

Accordingly, it is a general object of this invention to provide new and improved selectors.

It is another object of this invention to provide selectors that utilizes a minimum number of relays for performing the many functions of digit absorbing selectors.

Still another objects of this invention is to provide for reuse of relays to control selectors.

Yet another object of this invention is the use of switch magnets for circuit control as well as for switch control.

These and other objects of the invention are accomplished by means of a selector comprising a two motion automatic switch using only five control relays and functioning as directed by level-markings on auxiliary contacts. One level marking causes the switch to perform a self-interrupted, hunting operation. Another level-marking blocks further switch operation and sends busy tone. Still another level-marking causes switch drop-back and unlock. While yet another level-marking causes the switch to drop back whenever directed thereto. Only five relays are required in the switch control circuit because certain components are reused. For instance, a relay which is used for directing the switch in a primary direction to a level is also used for controlling switch operations during secondary switch motion. Switch release is controlled by a two-step electro-magnet which, along with other functions, releases the switch on an initial step and removes dial tone on a resultant step. The switch-through relay also has a multiplicity of uses such as use in connection with digit-absorb-once-only levels, and with switch-blocked levels, as well as for the removal of dial tone and application of busy tone.

The above mentioned and other objects and advantages of the subject invention and the manner of obtaining them will become more apparent while the invention itself will be best understood by making reference to the following description of a preferred embodiment of the invention taken in conjunction with the accompanying drawing which shows in combined block and schematic form part of a telephone system including a digit absorbing selector.

Where possible, simple terms are used and specific items are described hereinafter to facilitate an understanding of the invention; however, it should be understood that the use of such terms and references to such items are not to act in any manner as a disclaimer of the full range of equivalents which is normally given under established rules of Patent Law. For example, the drawing shows a release magnet which illustrates the principle of a two-step switch control magnet that may perform not only mechanical switch control but also electrical control; whereas, the principle may be applied to any similar magnets such as the vertical or rotary magnets.

The invention contemplates a telephone switching arrangement which may take any suitable form; however, the specific embodiment that is shown in the drawing comprises a vertical and rotary, step-by-step switch having a principal set of wipers or brushes 60–62 and a vertical or auxiliary wiper or brush AW–1. Responsive to the receipt of digit pulses, both the principal and the auxiliary wipers (60–62 and AW–1) are driven in a first or primary direction. Principal wipers 60–62 come to rest adjacent to a selected level of contacts and auxiliary wiper AW–1 comes to rest on a particular terminal which is individually associated with the selected level, thus providing means for selectively marking individual levels via H, B, A and AR wiring in accordance with functions which are required on such levels. Each of the levels includes first terminals to which telephone lines are connected and final or over flow contacts to which other or supervisory devices (such as a peg count meter) may be connected. Three switch controlling magnets V, R and Z are shown. One (magnet Z) is a two-step affair which operates to its initial step when energized by solid ground applied via off-normal contacts N1, and to its resultant step when energized at reduced current via resistance RY1. More particularly magnet Z is a release magnet which is used for restoring the wipers to normal after either an "A" level is dialed, an "AR" level is dialed or a call is terminated. In all these cases the magnet has to be operated to its initial step in order to insure the proper release of the switch. Magnet Z is also used for removing dial tone from the line after the switch is restored from an "A" or an "AR" level. On these levels the release magnet is initially energized by ground applied directly over off-normal contacts N1. The Z1 contacts are adjusted so that the break contact breaks only after the release mechanism that holds the switch in the dialed positions is disengaged. This insures the complete release of the switch. While the magnet is in its initial and resultant steps contacts Z1 opens the circuit to auxiliary wiper AW–1. In its resultant step only the contacts Z1 and Z2 are engaged ("RM" is not engaged) to remove dial tone from the line. Magnet Z remains in the resultant step until the next digit is dialed. The locking circuit to magnet Z is opened by the operation of contact V1 with the first pulse of the next digit. One of the reasons for keeping magnet Z in its resultant step is to prevent destruction of the Z magnet coil when it is operated between dialing. Therefore, the two-step operation of a switch controlling magnet may cause a unique circuit operation such as the control of supervisory signals in addition to normal switch control. It is thought that the remaining individual components that are shown in the drawing are well known to those skilled in the art.

*Brief description*

The drawing shows, in block diagram form, a portion of a typical telephone system, i.e. the calling subscriber station "A" is shown as connected to a line circuit which in turn is connected to an allotter and a linefinder that may cooperate to seize the selector which is shown schematically. When calling subscriber "A" dials, line relay 30 operates and releases to drive primary or vertical magnet V in accordance with the series of pulses that are received. At this time line relay 30 is connected to the talking conductors through contacts 41 and 42 and also 12 and 13. Each time the vertical magnet is energized, wipers 60–62 along with auxiliary wiper AW–1 are raised one level. The level-marked auxiliary contact banks may cause any of the plurality of different functions, such as hunting, blocking, digit-absorbing-once-only, and digit-absorbing-repeatedly. These markings are depicted as an "H" level, a "B" level, an "A" level, and an "AR" level, respectively.

When vertical auxiliary wiper AW–1 is directively stepped to the "H" level, level-mark relay 40 operates, thereby opening contacts 41 and 42 for disconnecting line relay 30 from the line and for converting it to operate as a lock-pulse relay under control of rotary interrupter contacts R1. Thereafter, the switch may step selectively in the secondary or rotary direction while hunting for an idle marking which causes relay 50 to operate from battery on wiper 60.

The "B" level is marked by negative battery applied through the winding of switch-through relay 50. Responsive to the operation of switch-through relay 50, contacts 53 close and send busy tone to the dialing subscriber "A." The switch is released in the usual manner when subscriber "A" replaces the receiver or handset thereby opening hookswitch contacts and releasing line relay 30.

The "A" level is also marked by negative battery applied through the winding of switch-through relay 50. However, level "A" is connected to operate release magnet Z through contacts 56; whereas, level "B" is barred from connection with the release magnet by rectifier RR2. Responsive to the ground marking on the auxiliary wiper AW–1 while operated to an "A" level, switch-through relay 50 operates to close contacts 56, thus causing the operation of release magnet Z to its initial step and the operation of level-mark relay 40. Responsive to the initial step operation of release magnet Z, dial tone is removed by the opening of contacts Z2, and release magnet Z is held operated in its resultant step position due to the reduced current caused by the insertion of resistance RY1 when contacts N1 open on drop-back and contacts Z1 operate. In this resultant step position, no dial tone is transmitted because contacts Z2 remain open; however, the release mechanism "RM" returns to normal to allow further switch operation. Responsive to the operation of the level-mark relay 40, switch-through relay 50 drops out. At this juncture, the switch is unlocked so that if directed to an "A" level again, it will hunt.

An "AR" level is marked by negative battery that is extended through the winding of release magnet Z, thus causing the switch to release whenever wiper AW–1 is directed to this level.

*Detailed description*

It is thought that a more complete understanding of the invention will result from the following description of the selector shown in the drawing.

*Seizure.*—Means is provided for seizing the selector responsive to hookswitch control at a calling subscriber station. When the calling subscriber removes his receiver or handset from its hookswitch, the line circuit, allotter and linefinder operate in a normal manner. Ground from incoming sleeve "P" is applied through off-normal contacts N3 to battery via the lower winding of series relay 10 which operates. Responsive to the application of battery through the lower winding of series relay 10 to incoming sleeve conductor "P," the preceding equipment switches through to complete a loop for operating line relay 30. The calling subscriber hears dial tone transmitted over a circuit extending through contacts 52, Z2, the lower winding of line relay 30, contacts 13 and 42 in parallel, conductor "R," the loop extending to station "A" and return over conductor "T," contacts 12 and 41 to battery through the upper winding of relay 30.

Responsive to the operation of line relay 30, contacts 33 open a circuit which is used later to control rotary switch motion. Also responsive to the operation of line relay 30, contacts 31 close to complete an obvious circuit for operating hold relay 20. Contacts 32 open to break a circuit extending from ground to contacts 22 and 21.

Responsive to the operation of hold relay 20, normally open contacts 21 close to prepare a circuit extending from the ground connection of contacts 32. The normally closed contacts 22 open but have no effect. Normally open contacts 23 close to extend ground through rectifier RR1 to normally open contacts N2 and also in parallel to the normally open contacts 45. Normally open contacts 24 close to extend ground through the lower winding of switch-through relay 50 and normally open overflow contacts OF3. Normally open contacts 25 close without effect at this time. Contacts 26 are employed when time disconnect is not required—its connects ground to preceding stages, to normally closed off-normal contacts N3, to normally closed contacts 46, and to normally open contacts 59A. If timed disconnect is required, any suitable external adapter (not shown) is utilized to remove ground applied to contacts 26 after the elapse of a measured period of time.

When series relay 10 operates as explained above, normally closed contacts 15 break the ground circuit that extends through contacts 23, Z1, 15 and 43 to the auxiliary or vertical level wiper AW–1; thus keeping ground off the auxiliary wiper while it is stepped responsive to dialing. Normally closed contacts 11 open without effect. Contacts 12 and 13 close to connect the upper and lower windings of line relay 30 to talking conductors "T" and "R." Normally open contacts 14 close to hold series relay 10 during subscriber dialing and to provide part of the pulsing path for vertical magnet V. Normally open contacts 16 close to apply ground to a supervisory alarm circuit, or to provide a start signal for timing.

To summarize, seizure of the selector results in the operation of line relay 30, hold relay 20, and series relay 10. Ground paths are prepared for maintaining series relay 10 during dialing and for pulsing primary or vertical magnet V through contacts 32, 21 and 14. Circuits are opened to prevent operation of the rotary magnet, to remove ground marking from the auxiliary wiper during stepping, and to prevent the operation of line relay 30 through rotary interrupter contacts R1. The seizure operation also results in transmission of dial tone to the calling subscriber.

*Primary Switch Motion.*—Drive means is provided in the form of line relay 30 to control the operation of the switch as it moves in a first or primary direction responsive to the receipt of subscriber transmitted switch directing control signals. Although it is within the scope of the invention to use any suitable signaling system, the drawing discloses means for responding to open loop pulsing, i.e. the subscribed dial (not shown) is adapted to open and close a loop across talking conductors "T" and "R" a number of times which corresponds to the numerical value of a digit that is dialed. Relay 30 releases and re-operates responsive to each open loop pulse since it is held operated over a circuit which includes the loop and pulsating dial contacts. Each time that line relay 30 releases, contacts 32 close to operate primary or vertical magnet V over a circuit which may be traced from battery through the winding of magnet V, contacts 14, 21 and 32 to ground. Each time that magnet V operates the principal wipers 60–62 and auxiliary wiper AW–1 are driven one step in a primary or vertical direction.

It should also be noted that during the time between digit pulses when the subscriber dial recompletes the loop, relay 30 reoperates to close contacts 31 for energizing hold relay 20 which remains in a continuously operated condition due to its own slow release characteristics.

Responsive to the commencement of vertical stepping, off-normal contacts N1 close to prepare a path for release magnet Z, off-normal contacts N2 close to prepare a self-locking path for level-mark relay 40, and normally closed off-normal contacts N3 are opened to break the circuit over which series relay 10 originally operated. Thereafter, series relay 10 remains operated due to its slow release characteristics and periodic energization over the path traced from battery through the series relay 10 upper winding, contacts 14, 21 and 32 to ground.

At this juncture, any suitable end-of-dial-pulse-train detecting device such as series relay 10 may operate, i.e. after off-normal contacts N3 open and during dialing, relay 10 is held operated over a circuit that may be traced from battery on the upper winding of relay 10 through contacts 14, 21 and 32 to ground. Contacts 32 are pulsed responsive to the operation and release of line relay 30 as it repeats dial pulses. After the end of the digit-pulse-train, contacts 32 remain open for a period which is greater than the release time of relay 10 which, therefore, drops out. Responsive to relay 10 returning to its normal or unoperated state, contact 15 closes placing ground on the auxiliary wiper AW–1 over a circuit that can be traced from ground on contact 23 through contacts 21, 15 and 43 to wiper AW–1. Also responsive to the release of relay 10, contacts 14 open the circuit to primary or vertical magnet V and series relay 10. Contacts Z1, 15 and 43 to wiper AW–1. Also responsive to rupter contacts R1.

Summarizing the directive stepping operation, any suitable means may be used for directively causing the switch to move in a primary direction responsive to the receipt of incoming digit signals; for example, in the embodiment of the invention herein described line relay 30 operates contacts 31 to drive vertical magnet V. Upon termination of the digit-pulse-train, wipers 62–62 are resting at the directed level, auxiliary wiper AW–1 is marked with ground, relays 30 and 20 are operated, relay 30 is connected to open rotary interrupter contacts R1, and vertical magnet V is disconnected from the circuit. The switch is now prepared for its next operation which depends on the level to which the switch was operated.

*Hunt Level* (*H Wiring*).—Next, it is assumed that the switch is operated in a primary direction to a level that is marked by "H" wiring which causes the switch to hunt over contacts during a secondary or rotary switch motion.

Means is provided for changing-over the switch motion from a primary or vertical direction to a secondary or rotary direction responsive jointly to the release of series relay 10 at the end of a digit-pulse-train and to the operation of level-mark relay 40 via "H" wiring. Responsive thereto contacts 12, 13, 41 and 42 open to disconnect line relay 30 from the talking conductors and contacts 11 close to connect line relay 30 to rotary interrupter contacts R1. Thereafter line relay 30 is reused as a lock-pulse relay. That is, contacts 33 close to operate a secondary or rotary magnet R which causes the switch to take one step in a secondary direction, the circuit extending from battery through the winding of magnet R, contacts 33, 57, 44, 15, Z1 and 23 to ground. A mechanical interlock (not shown) closes contacts R1 near the end of switch travel to operate line relay 30 over the circuit extending from battery through the winding of relay 30, contacts 11 and R1 to ground. Responsive thereto, contacts 33 open to release rotary magnet R. After a complete step, the mechanical interlock opens contacts R1 to release line relay 30 and in turn close contacts 33, thus initiating another step. The lock-pulse cycle just described insures complete steps despite any minor variations in the energization of magnet R.

Hunting is initiated when ground is applied to level-mark relay 40 over a path traced from negative battery through the relay winding, normally closed overflow spring contacts OF2, hunt level conductor "H," auxiliary or vertical level wiper AW–1, contacts 43, 15, Z1 and 23 to ground. Level-mark relay 40 operates and then locks over a path traced from negative battery on the relay winding, through normally closed overflow contacts OF2, resistor RY2, "X" or preliminary contacts 45, and operated off-normal contacts N2 to ground.

Responsive to the operation of relay 40, contacts 43 open, thus removing ground from auxiliary wiper AW–1 while contacts 44 close preparing a ground path for rotary magnet R. Contacts 41, and 42 open to disconnect line relay 30 from the line. Responsive thereto, line relay 30 drops out and completes a ground circuit to operate rotary magnet R over a path which can be traced from the negative battery on rotary magnet R through contacts 33, 57, 44, 15, Z1 and 23 which remain closed after release of relay 30 due to the slow release characteristics of hold relay 20. Also responsive to the operation of level-mark relay 40, contacts 46 open to break a path to switch-through relay 50.

Responsive to the operation of rotary magnet R, wipers 60–62 step into the bank. Responsive thereto, rotary interrupter contacts R1 close, thus operating line relay 30 over a path including contacts 11. This in turn pulses rotary magnet R and causes another rotary step to be taken. The rotary stepping continues until switch-through relay 50 operates either in response to an idle marking encountered by wiper 60 or to a marking applied by the actuation of overflow springs OF1.

First, it is assumed that an idle marking in the form of negative battery is encountered by wiper 60 during secondary switch motion. Responsive thereto, switch-through relay 50 operates over a path traced from negative battery on wiper 60, through normally closed overflow contacts OF1, the lower winding of relay 50 and contacts 24 to ground. Responsive to the operation of the switch-through relay 50, "X" or preliminary contacts 57 open the pulsing circuit to the rotary magnet. Contacts 59 and 59B complete a holding circuit that can be traced from the negative battery on the upper winding of relay 50 through contacts 59, 59B, N3 (operated) and 26 to ground. Also responsive to the operation of switch-through relay 50, contacts 55 open a circuit to release magnet Z. Contacts 52, 53, 56 and 58 close without effect at this time. Contacts 51 and 54 close to switch-through the heavily inked talking conductor to outgoing wipers 61 and 62. Contacts 59A prepare a parallel holding circuit for switch-through relay 50.

Next, it is assumed that an all busy condition is met, that no idle markings are found during secondary switch motion and that the principal wipers are driven into overflow where any suitable supervisory functions may be performed, for example, an all trunks busy signal may be given, a busy tone generator may be started, etc. In this preferred embodiment of the invention, overflow contacts OF1, OF2 and OF3 are operated responsive to rotary motion to a last step position such as the eleventh step. Level-mark relay 40 drops out when contacts OF2 open and switch-through relay 50 operates over a path traced from negative battery on the upper winding of relay 50 through overflow contacts OF3 and contacts 24 to ground. When relay 50 operates, busy tone is applied over contacts 53, Z2, the bottom winding of line relay 30, contacts 42, conductor "R," the line of station "A" and returns via conductor "T," contacts 41 and the top winding of relay 30 to battery. Overflow contacts OF1 place a ground marking on wiper 60 which can be used to control various supervisory functions such as to operate an all trunks busy meter or to start a busy tone generator.

When the switch is at an "H" level, it is released when the calling subscriber returns the handset or the receiver to the hookswitch. Responsive thereto, line relay 30 drops out; subsequently, hold relay 20 follows to open contacts 24 and 26; consequently, switch-through relay 50 also drops out completing a path for release magnet Z which may be traced from negative battery on the "RELEASE ALARM" conductor, the winding of release magnet Z, contacts N1, 55, 22 and 32 to ground.

To summarize, the switch steps in a secondary direction either until wiper 60 is operatively connected to a contact providing an idle indicating negative battery or until the switch steps over all the rotary contacts to operate eleventh step overflow springs. In either case, switch-through relay 50 operates. If no idle equipment is found, relay 40 is released and busy tone is sent to the calling subscriber through contacts 53. If an idle marking is found, the operation of relay 50 causes switch-through. In both cases, release magnet Z operates the release mechanism only when the calling subscriber at station "A" returns the handset to the hookswitch. Thus, on an "H" level there is either a completed call or a busy signal.

*Blocked Level* (*B wiring*).—Means is provided for blocking secondary switch motion and returning busy tone when the switch is stepped in a primary direction to a "B" level. That is, responsive to the auxiliary or vertical level wiper AW–1 being stepped to a "B" level, switch-through relay 50 operates over a path traced from the negative battery on its upper winding through the "B" level, wiper AW–1, contacts 43, 15, Z1 and 23 to ground. Note that relay 40 does not operate at this time. Responsive to the operation of relay 50, "X" or preliminary contacts 57 open, disconnecting rotary magnet R from its ground, thus blocking secondary switch motion. Busy tone is sent to the calling subscriber station over a circuit traced from busy tone lead through contacts 53, Z2, the lower coil of line relay 30, contacts 42 to the calling loop and return over contacts 41 to the upper coil of relay 30 and battery. The switch releases when the calling subscriber closes hookswitch contacts by hanging-up. The release is then accomplished as described above. Diode rectifier RR2 isolates the release magnet from wiper ground, i.e. current does not flow over the circuit extending from ground on wiper AW–1 through wiring B, diode RR2, contacts 56, N1 and the winding of magnet Z. Thus, on a "B" level, switch-through relay 50 operates as a means for blocking further operation of the switch and for sending busy signals.

*Digit-Absorb-Once and Unlock* (*A wiring*).—Means is provided for causing the switch to drop-back, absorb one digit, and unlock if an "A" level is encountered during primary switch motion. In greater detail, responsive to the stepping of the auxiliary or vertical level wiper AW–1 to an "A" level, switch-through relay 50 is operated over the circuit extending from battery through the upper winding of relay 50, diode RR2, wiring "A," wiper AW–1, contacts 43, 15, Z1 and 23 to ground. When switch-through relay 50 operates, two-step release magnet Z operates to its initial step over a path traced from negative battery on the "RELEASE ALARM" conductor, through the winding of release magnet Z, contacts N1, 56, wiring "A," wiper AW–1, contacts 43, 15, Z1 and 23 to ground. The release mechanism "RM" is adapted to cause the switch to return to normal when the release magnet Z is operated to its initial step. After the switch does return to normal, off-normal contacts N1 open to break the circuit over which magnet Z operated; however, as explained above another circuit has already closed at contacts Z1 for holding magnet Z on its resultant step.

When the release magnet operates contacts Z2 disconnect supervisory signals such as dial tone and busy tone from the line. With contacts Z1 operated, a circuit is completed to release magnet Z which can be traced from the negative battery on the "RELEASE ALARM" conductor through the winding of the release magnet Z, current limiting resistor RY1, vertical interrupter contacts V1, operated contacts Z1 and contacts 23 to ground. With this circuit, the reduced current causes release magnet Z to operate to its resultant step; whereupon, its contacts Z1 and Z2 remain operated but the release mechanism "RM" is returned to a normal condition, thereby allowing the switch to be stepped again.

Also in conjunction with the release of the switch to its normal condition, off-normal contacts N1, N2 and N3 return to normal; whereupon, level-mark relay 40 is operated over a circuit traced from battery on relay 40 through contacts OF2, resistance RY2, contacts 58 and N2 to ground; and is locked through a circuit including contacts OF2, resistance RY2, contacts 45 and 23 to ground. Responsive to the operation of level-mark relay 40, the hold circuit for switch-through relay 50 is opened at contacts 46, thus causing switch-through relay 50 to drop out. Also responsive to operation of level-mark relay 40, ground is removed from auxiliary wiper AW–1 when contacts 43 open. A ground path to rotary magnet R is prepared by the closure of contacts 44.

The selector is now in an unlocked condition, i.e. if vertical or auxiliary wiper AW–1 is directed to an "A" level a second time, switch-through relay 50 is not actuated because relay 40 is holding contacts 43 open and there is no ground on auxiliary wiper AW–1. It should be noted that during vertical or primary switch motion, vertical interrupter contacts VI open to release magnet Z; however, dial tone is not returned to the line when contacts Z2 close because line relay 30 is disconnected from the talking conductors "T" and "R" responsive to the release of relay 10, as explained above. Normally open vertical interrupter contacts V2 are in the circuit to insure the complete release of magnet Z regardless of the shortness of the pulse actuating vertical magnet V. A short pulse that opens the V1 contacts for a time that is insufficient to cause the Z magnet to release the Z1 contacts will, however, close the V2 contacts. Vertical magnet V is thus energized over a path that can be traced from battery on vertical magnet V through contacts V2, Z1 and 23 to ground. Vertical magnet V remains energized until interrupter contacts V1 open, thus causing the complete release of the Z magnet and consequently opening the Z1 contacts and releasing the V magnet. When the dialing of the second digit is completed, series relay 10 drops out and closes the circuit to rotary magnet R as follows: battery, magnet R, contacts 33, 57, 44, 15, Z1 and 23 to ground. When series relay 10 returns to its unoperated condition, line relay 30 is connected as a lock-pulse relay which is operated in series with the rotary interrupter contacts R1 as explained above under the heading "Hunt Level."

To summarize switch action at an "A" level: the operation of the auxiliary wiper AW–1 to an "A" level results in a digit-absorb-once-only operation through the interaction of switch-through relay 50, level mark relay 40 and two step release magnet Z. That is, when release magnet Z is operated via wiring "A" to its initial step contacts Z1, Z2 and release mechanism "RM" are all actuated. When operated to its resultant step a unique operation occurs in that release mechanism "RM" is returned to normal while contacts Z1 and Z2 are still operated. Operated contacts Z2 remove any unnecessary supervisory signals, such as dial tone, trunk busy tone, normal busy tone, etc. The operation of level mark relay 40 unlocks the switch and allows rotary stepping when the switch is directed to an "A" level a second time.

*Digit Absorbed Repeatedly* (*AR Wiring*).—In accordance with the invention, digits may be absorbed any number of times and without regard to the sequence in which they are dialed if the switch is directed in a primary direction to an "AR" level from which it always drops back.

When auxiliary wiper AW–1 is directed to an "AR" level, release magnet Z is energized over a circuit traced from battery on the "RELEASE ALARM" conductor through the winding of magnet Z, contacts 55, wiring "AR," auxiliary wiper AW–1, contacts 43, 15 Z1 and 23 to ground. Operation of release magnet Z returns the switch to normal and operates release magnet contacts Z1 and Z2. Contacts Z1 close the current limiting circuit including resistance RY1 to release magnet Z and contacts Z2 remove dial tone, all as described above in connection with the digit-absorbed-once level. As soon as dialing recommences, the limited current circuit is broken by operation of vertical interrupter contacts V1, thus releasing magnet Z as described above in connection with the digit-absorbed-once level. The operation just described is repeated as many times as an "AR" level is dialed, regardless of the sequence in which it is dialed.

Summarizing switch operation at an "AR" level: when the switch is stepped to the "AR" level, release magnet Z operates thereby releasing the switch and removing dial tone. An "A" level is distinguished from an "AR" level by the fact that at the latter level neither relay 40 nor 50 is operated.

While the principles of the invention have been described above in connection with specific apparatus, it is to be clearly understood that this description is made only by way of example and not as a limitation to the scope of the invention.

We claim:

1. In a telephone system a drop back selector having only five control relays, said selector comprising a plurality of levels of contacts and associated principal wipers, means comprising an auxiliary wiper and associated terminals, each of said terminals corresponding to an individually associated one of said levels, means for selectively marking at least some of said terminals, means for simultaneously operating said auxiliary wiper and said principal wipers in a primary direction, means responsive to certain of said markings for causing said selector to hunt over said contacts in the level to which said principal wipers were directed, means responsive to a second of said markings for blocking further operation of the said selector and for transmitting busy signals, means responsive to still other of said markings for causing said selector to absorb once and unlock, and means responsive to still other of said markings for causing said selector to absorb repeatedly.

2. The selector of claim 1 wherein each of said levels includes first of said contacts to which telephone lines are connected and at least one other contact for completing supervisory connections, and means responsive to said hunt means driving said principal wiper to said other contact for completing said supervisory connection.

3. In a telephone system, a vertical rotary motion drop back selector having only five control relays, said selector comprising a switch including a set of wipers having a plurality of levels of contacts disposed for engagement by said wiper set and an auxiliary wiper having associated auxiliary contacts, each of said auxiliary contacts corresponding to an individually associated one of said levels, means for selectively marking at least some of said auxiliary contacts, means for simultaneously operating all of said wipers in said vertical motion, means responsive to certain of said markings for causing said selector to operate in said rotary motion, means for extending busy tone through said selector, means responsive to other of said markings for blocking further operation of said selector and for operating said busy tone extending means, and means responsive to still other of said markings for causing said selector to absorb a digit-only-once, and means responsive to yet another of said markings for causing said selector to absorb repeatedly.

4. A telephone system switching arrangement including an automatic switch comprising a plurality of contact levels, line relay means for directively causing said switch to move in a primary direction to a particular one of said contact levels responsive to the receipt of incoming switch directing signals, and means for reconnecting said line relay means as a lock pulse relay to cause said switch to move selectively in a secondary direction.

5. In a telephone system, switching means comprising a two motion switch having a plurality of means including primary and secondary magnets and primary and secondary interrupter contacts for operating said switch in primary and secondary directions respectively, means including talking conductors incoming to said switching means for transmitting switch directing signals, means including a line relay electrically connected to at least one of said conductors for operation responsive to said signals, means responsive to said line relay for operating said primary magnet to step said switch in said primary direction, means for disconnecting said relay from said conductors, means for connecting said relay to said secondary interrupter contacts for reoperating said relay as a lock-pulse relay, and means responsive to said reoperation of said relay for operating said secondary magnet, thereby stepping said switch in said secondary direction.

6. A two-motion automatic telephone switching arrangement comprising at least one incoming talking conductor, means including a line relay connected to said talking conductor for controlling one of said motions responsive to the receipt of switch directing signals, change-over means for preparing said switching arrangement to operate in the other of said motions, and means responsive to operation of said change-over means for disconnecting said line relay from said talking conductor and for connecting said line relay to operate as a lock-pulse relay during said other motion.

7. The arrangement of claim 6 wherein said switching arrangement comprises a plurality of banks of contacts, means for selectively marking certain of said banks of contacts, and means for detecting the end of said switch directing signals, said change-over means comprising means jointly responsive to at least one of said marking means and to said detecting means.

8. In a two motion telephone selector switching arrangement with a normal position and a plurality of off-normal positions, the combination with said arrangement comprising; first means responsive to directive signals for operating said selector to a selected one of said off-normal positions; release magnet means responsive to a predetermined control signal level for returning said selector to said normal position, for reducing said control signal level, and for controlling supervisory signals; and means for operating said release magnet means responsive to said reduced control signal level for maintaining said reduced level, for maintaining said control of said supervisory signals, and for allowing reoperation of the said selector responsive to additional directive signals.

9. In a telephone system, a selector comprising a two motion switch having a plurality of levels, means for operating said switch to any of said levels, means for applying supervisory signals to said system, means comprising a two-step magnet operative to one of said steps for releasing said switch and for disconnecting said supervisory signal means, means responsive jointly to said release of said switch and the operation of said magnet to said one step for operating said magnet to the other of said steps, means responsive to said operation of said magnet to said other step for maintaining disconnection of said supervisory signals and for maintaining said magnet on said other step, and means for thereafter reoperating said switch to any of said levels.

10. In a telephone system, means comprising a selector including a switch having a plurality of levels, drive means responsive to the receipt of a digit-pulse-train for causing the operation of said switch to any of said levels, release mechanism, relay type contacts, switch control means comprising an electro-magnet having control over said release mechanism and said relay-type contacts, means comprising at least two circuits for energizing said electro-magnet, means responsive to energization of said electro-magnet over one of said circuits for operating both said release mechanism and said contacts, means responsive to operation of said release mechanism for releasing said switch, means responsive to energization of said electro-magnet over another of said circuits for operating said contacts only, means responsive to the receipt of additional digit-pulse-trains for reoperating said drive means to cause the reoperation of said switch to any of said levels, and means for thereafter connecting said drive means to cause the operation of said switch into a selected level.

11. A telephone selector comprising a two motion switch with a plurality of selectively marked levels, means comprising an auxiliary switch wiper for detecting said markings at the end of one of said switch motions, line relay means responsive to directive signals for operating said switch in said one motion to one of said levels, means responsive to detection of certain of said markings on said one level for connecting said line relay means to control self-interrupted hunting operations of said switch in the other of said motions, release magnet means responsive to detection of other of said markings for causing said switch to drop back, and means responsive to the operation of said last named means for causing removal of dial tone.

12. In a telephone system, means comprising a two motion switch having a plurality of selectively marked primary motion positions, means for transmitting supervisory signals through said system, said supervisory signals including busy tone, means including a release magnet for returning said switch to normal and controlling the transmission of at least some of said supervisory signals, line relay means responsive to the receipt of digit-pulse-trains for operating said switch to one of said primary positions, cut through relay means responsive to certain of said primary position markings for blocking secondary switch motion and sending said busy tone, means responsive to other of said markings on other of said primary positions for causing said cut through relay means to operate said release magnet, and means responsive to reoperation of said switch to said other primary position for preventing reoperation of said release magnet responsive to said other marking.

13. The system of claim 12 and means for connecting said line relay means to control self-interrupted hunting of said switch in one of said two motions.

14. In a telephone system; means comprising a two motion switch having an auxiliary wiper, principal wipers, a plurality of off-normal contacts, and contact banks, each of said contact banks having one of said off-normal contacts individually associated therewith; means for operatively connecting said auxiliary wiper to any selected one of said off-normal contacts when said switch is directively operated in one of said motions; switch-through relay means; means responsive to said auxiliary wiper engaging certain of said off-normal contacts for operating said switch-through relay means; means responsive to said operation of said switch-through relay means for blocking further operation of said switch and for returning busy tone; means responsive to said auxiliary wiper engaging other of said off-normal contacts for also operating said switch-through relay means; release magnet means for releasing said switch; means responsive to said last named operation of said switch-through relay means for operating said release magnet means; means responsive jointly to said last named operation of said switch-through relay means and said operation of said release magnet means for unlocking said switch; means thereafter responsive to operation of said switch in a second of said motions for operatively connecting said principal wipers to certain contacts of said contact banks; means for busy testing said certain contacts; said last named means comprising means for connecting said switch-through relay means to at least one of said principal wipers; means responsive to detecting an idle condition on said certain contacts for operating said switch-through relay means; means responsive to said last named operation of said switch-through means for switching through said switch; means responsive to detecting a busy condition on said certain contacts for driving said principal wipers in said second motion to the next contacts of said banks; overflow contact means; means responsive to an all busy condition for driving said principal wipers to the end of said second motion; means responsive to said last named means for operating said overflow contacts; and means responsive to operation of said overflow contacts for returning busy tone.

15. The system of claim 14 and means responsive to operation of said overflow contacts for extending supervisory signals through at least one of said principal wipers.

References Cited by the Examiner

UNITED STATES PATENTS

| | | | |
|---|---|---|---|
| 2,029,018 | 1/1936 | Cruickshank | 179—16 |
| 2,592,784 | 4/1952 | Bakker | 179—18 |
| 2,701,283 | 2/1955 | Droel | 200—105 |
| 2,817,712 | 12/1957 | Lomax | 179—18 |
| 2,820,101 | 1/1958 | Pharis | 179—16 |
| 2,845,493 | 7/1958 | Muller | 179—18 |
| 2,847,534 | 8/1958 | Edgarton | 200—105 |
| 2,892,893 | 6/1959 | Pharis | 179—16 |
| 2,908,763 | 10/1959 | Sladek | 179—18 |
| 2,923,774 | 2/1960 | Topfer et al. | 179—16 |
| 2,934,608 | 4/1960 | Bakker | 179—16 |

ROBERT H. ROSE, *Primary Examiner.*

WALTER L. LYNDE, L. MILLER ANDRUS, *Examiners.*